Nov. 18, 1958 F. A. KROHM 2,860,364
WINDSHIELD WIPER ARM ASSEMBLY
Filed Jan. 2, 1953 3 Sheets-Sheet 1
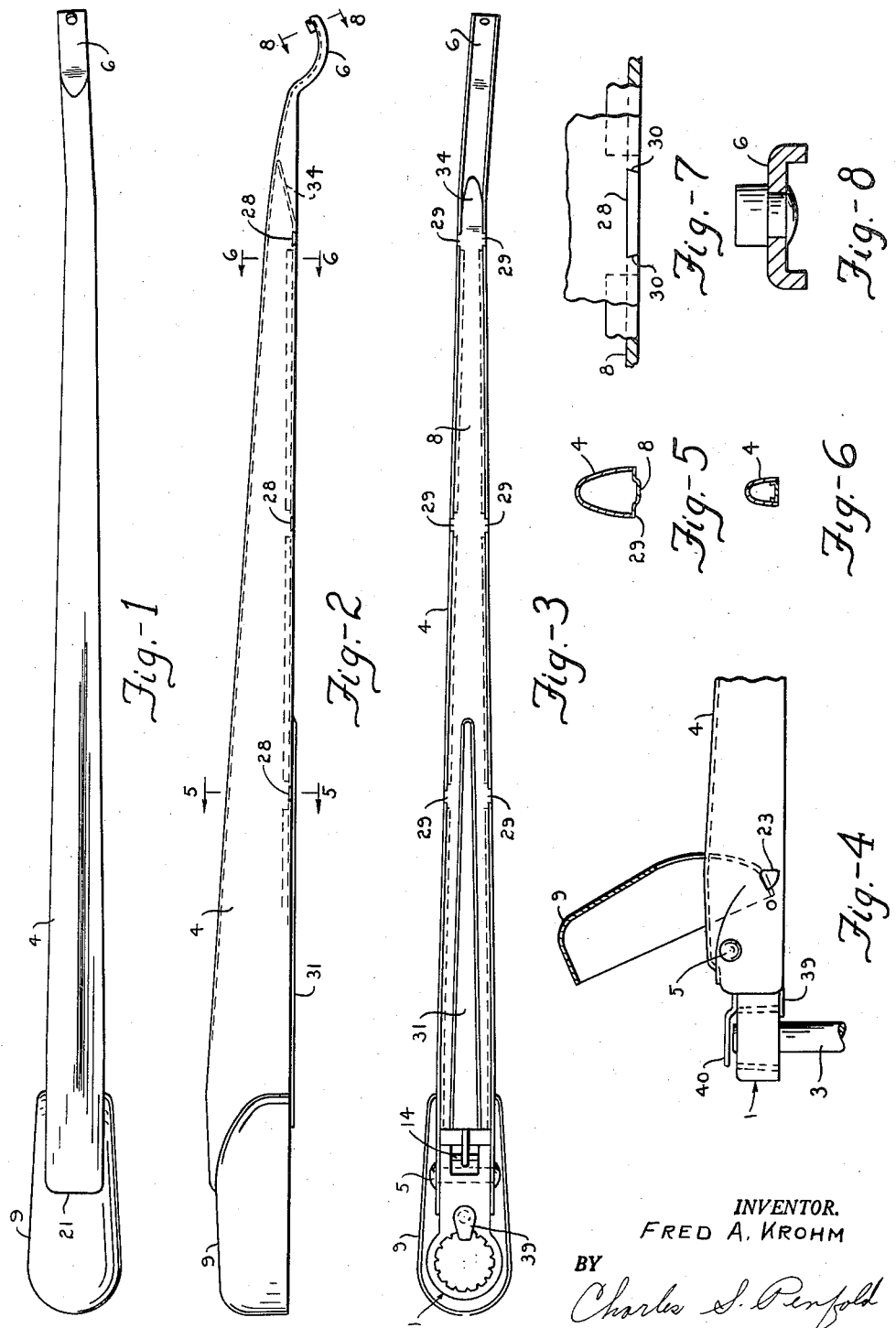
INVENTOR.
FRED A. KROHM
BY
Charles S. Penfold
ATTORNEY

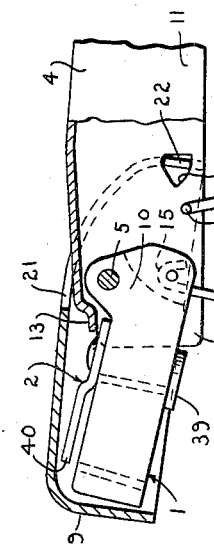

Nov. 18, 1958    F. A. KROHM    2,860,364
WINDSHIELD WIPER ARM ASSEMBLY
Filed Jan. 2, 1953    3 Sheets-Sheet 3
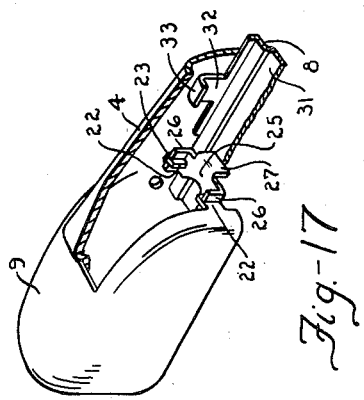
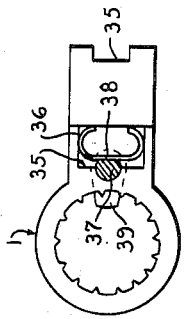
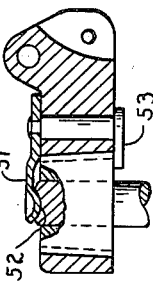
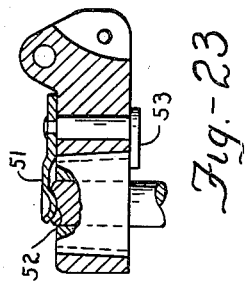
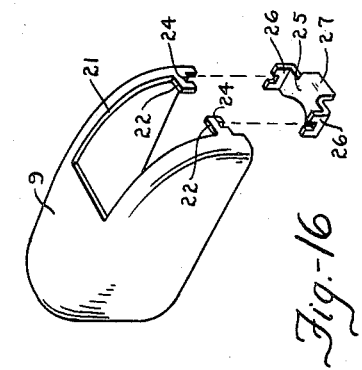
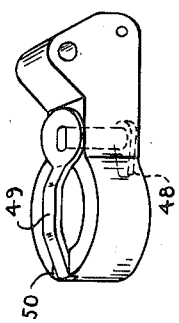
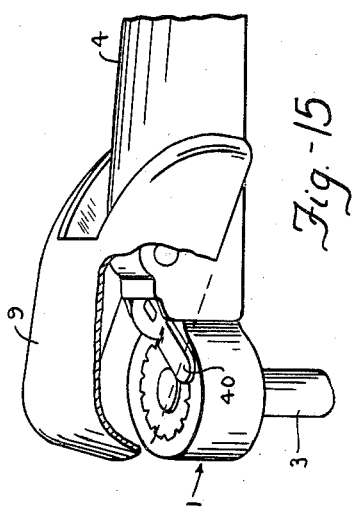
INVENTOR.
FRED A. KROHM
BY
Charles J. Penfold
ATTORNEY United States Patent Office 2,860,364
Patented Nov. 18, 1958

2,860,364

WINDSHIELD WIPER ARM ASSEMBLY

Fred A. Krohm, Hobart, Ind., assignor to The Anderson Company, a corporation of Indiana Application January 2, 1953, Serial No. 329,366

22 Claims. (Cl. 15—255)

This invention is directed to improvements in windshield wiper equipment.

An important object of the invention is to provide a wiper arm comprising a head or inner shaft attaching section and an outer elongated wiper blade carrying section, a cover for the outer section, a cap for the head section, and a unique spring assembly operatively related to the sections for performing a plurality of functions.

More particularly, an object of the invention is to provide a spring assembly which simultaneously serves to urge the outer blade carrying section of the arm toward a windshield, and assist in maintaining the cap and cover in predetermined covering positions with respect to the inner and outer sections of the arm.

A significant object of the invention is to provide a spring assembly of the off-center pre-load type comprising an elongated lever having a rear extremity pivotally connected to the inner end of the outer arm section and a free forward extremity extending into the outer section with the opposite ends of a spring respectively connected to the forward extremity of the lever and the forward end of the head section at predetermined locations for obtaining appropriate leverage to urge the outer section toward a windshield. The novel feature of this arrangement resides in respectively connecting the inner ends of the lever and spring to the inner end of the outer arm section and to the head section to permit movement or swinging of the forward or outer extremity of the spring assembly as distinguished from any of the conventional arrangements now in commercial use in which the outer end of a helical spring or leaf spring is secured to an outer arm section.

Another feature of the spring assembly is to construct the spring so that either end thereof may be easily connected to either the head section or the outer end of the lever.

A specific object of the invention is to provide an arm assembly in which the cap for the head section is pivotally mounted on the outer arm section with key means cooperating with the cap and the cover on the outer section in a manner whereby the spring on the spring assembly acts on the cover and the cover on the cap through the intermediation of the key means to normally maintain the cap in a position to conceal the head section. The key means also serves to positively lock the cap to the outer arm section.

A further object of the invention is to provide an arm assembly in which the outer arm section and the cap for the head section are constructed to permit the cap to be snapped into assembly with the outer arm section.

Another object of the invention is to promote harmony and continuity in the general design of the cap and outer section of the arm so that the exterior frontal surfaces thereof are smooth and streamlined and not interrupted by any unsightly rivets, fastening means, or configurations which are usually present in conventional arm constructions. More specifically in this regard, the cap is formed to cover the head section as well as the points of connection between the outer and head sections and the points of connection between the lever and outer arm section.

Another important object of the invention is to provide the head section with improved means for detachably connecting the head section to a drive shaft or fitting thereon. One novel feature of the locking means resides in the simplicity of its efficient operation and the fact that it cannot be manipulated until the cap is pivoted to permit access to the locking means.

An additional object of the invention is to construct the locking means and the cap so that the cap cannot be released to a full covering position about the head section until the locking means is in a predetermined locking position.

A further object of the invention is to design and construct the cap and the locking means in such a manner that the cap may be utilized to direct the locking means into a predetermined locking position.

Other attributes of the invention reside in its simplicity, efficiency of operation, and the manner in which the various components of the arm assembly can be manufactured and assembled on a production basis.

Referring to the drawings:

Figure 1 is a top view of the arm assembly;

Figure 2 is a side view in elevation of the arm assembly shown in Figure 1;

Figure 3 is a bottom view of the arm assembly shown in Figures 1 and 2;

Figure 4 is a partial view in elevation showing the arm operatively connected to a drive shaft and an elevated position of the cap which is adapted to cover the head section of the wiper arm;

Figures 5 and 6 are transverse sections respectively taken substantially on lines 5—5 and 6—6 of Figure 2;

Figure 7 is a fragmentary view illustrating the manner in which the cover is connected to the outer arm section;

Figure 8 is a transverse section taken substantially on line 8—8 of Figure 2 showing the character of an entering part on the outer arm section adapted for detachable connection with a connector on a wiper blade;

Figure 9 is an enlarged partial bottom view of the wiper arm assembly with portions in section for the purpose of exemplifying details of the construction;

Figure 10 is an enlarged longitudinal partial section of the arm showing the normal operative relationship between various components of the arm assembly;

Figure 11 is a view similar to Figure 10 showing the outer arm section in an elevated position and the mode of attaching the cover to such section;

Figure 12 is a view showing the manner in which the components of the spring assembly are operatively connected with one another and to the sections of the arm;

Figure 13 is a partial view of modified construction in which a cap for the head section of the arm is frictionally held in relation to such section without utilizing the spring assembly;

Figure 14 is a longitudinal view of the modified arm assembly in which the cover for the outer arm section is omitted;

Figure 15 is a view illustrating the manner in which the cap for the head section serves to actuate the locking means for detachably connecting the head section of tne arm to a shaft;

Figure 16 is a perspective view of the cap for the head section of the arm including key means for locking the cap to the outer arm section;

Figure 17 is a fragmentary perspective view showing the operative relationship between the key means, the cap and the cover for the outer arm section;

Figures 18, 19 and 20 are views showing structural details of the locking means employed by which the head section can be readily detachably connected to a drive shaft or to a fitting thereon;

Figure 21 is a partial view showing the operative relationship with the serrations provided on the head section and the fitting carried by the drive shaft; and Figures 22 and 23 are modified forms of locking means for attaching the head section of an arm to a shaft.

The subject matter of this application is related to the subject matter disclosed in my copending applications Serial No. 517,837 filed June 24, 1955, and Serial No. 625,977 filed December 3, 1956.

Referring primarily to Figures 1 through 3 and Figure 10 of the drawing there is shown an arm assembly, comprising, among other things, a head or inner shaft attaching section generally designated 1, locking means generally designated 2 for detachably connecting the head section to a drive shaft 3, an elongated channel outer arm section 4 having its inner end connected by a pivot 5 to the head section 1 and its outer end provided with an entering part 6 adapted for detachable connection to a fitting carried by a windshield wiper blade, a novel spring assembly generally designated 7, an elongated cover 8 carried by the arm section 4 for concealing the spring assembly, and a cap 9 movably supported on the arm section for covering the head section and the locking means.

The head section 1 of the arm includes a tapered cylindrical sleeve having internal longitudinal ribs or serrations which are adapted to cooperate with ribs formed externally on a fitting or drum fixed on the shaft 3 as shown in Figures 10, 15 and 21, the arrangement being such that the head section can be attached to the fitting in any one of an infinite number of rotative positions. The fitting shown is a separate part secured to the shaft but it may be formed as an integral part thereof. The head section is provided with a radial extension 10 having an upturned portion through which the pivot 5 extends.

The arm section 4 is generally in the form of a tapered channel of varying V-shape in cross section throughout the major portion of its length as shown in Figures 1, 2, 5 and 6 and includes corresponding side walls 11, the inner portions of which are preferably arranged in parallel relation as indicated at 12. The arm section is also provided with an inner flat front wall having an offset 13 which is disposed under the front wall of the cap 8 to promote continuity between the outer section and cap. The side wall portions 12 of the arm section straddle the radial extension 10 on the head section and the pivot 5 extends through these side portions and the upturned portion of the head section as shown in Figure 10 to pivotally connect the arm sections. The radial extension 10 is provided with a recess of a predetermined size and a pin 14 secured to the extension extends transversely therethrough the recess. This pin is preferably located below the pivot 5 and the inner hook end 15 of a helical spring 16 is detachably connected thereto.

The unique spring assembly generally designated 7 includes the spring 16 and an elongated lever preferably constructed of stiff but resilient wire. This lever is preferably made in the form of an elongated V having corresponding legs 17 which are preferably offset or angled at their inner extremities and formed with laterally extending pintles 18 constituting pivots which are seated in apertures provided therefor on the side positions 12 of the arm section 4 as shown in Figures 9 and 10. The outer free end of the lever is provided with an inturned loop 19 to which the outer hook end 20 of the spring is detachably connected. The spacing between the legs 17 of the lever is predetermined so as to afford sufficient clearance for movement of the spring therebetween. In order to facilitate assembly of the spring it is preferably so designed and constructed that either of its ends 15 and 20 may be detachably connected to the pin 14 on the head section or to the loop 19 on the lever. Attention is directed to the fact that the points of connection between the spring and the pin 14 and between the spring and the loop 19 are located at one side of the points of connection between the pintles 18 and the arm section 4 so as to obtain an appropriate leverage action which will normally urge such section in a direction toward a windshield. In other words, the spring and lever constituting the components of the spring assembly are operatively connected with respect to one another and with respect to the arm sections so that the line of force exerted by the spring is arranged in a predetermined location with respect to the pivot 5 as well as the points of connection just referred to so as to urge the arm section 4 in a direction so that the wiper blade attached to the entering part 6 will be pressed against a windshield.

The manner of attaching the spring assembly 7 to the arm sections will now be described. As exemplified in Figures 9, 10, and 12, it will be apparent that the lever is connected to the arm section 4 by merely pressing the legs 17 of the lever together and then inserting its inner extremity into the section so that when the pintles 18 register with the apertures in the side portions 12 of the section the legs will snap outwardly into the apertures. When the head section and arm section of the wiper arm are angled as shown in Figures 11 and 12, the ends 15 or 20 of the spring are respectively attached to the pin 14 and the head and the loop 19 of the lever, whereupon the free extremity of the spring assembly is pushed toward the outer arm section to increase the tension or preload the spring and when the extremity approaches a certain position determined by the points of connection above referred to, it will snap into and engage the arm section 4 as depicted by the dotted lines in Figure 12 to urge this section toward a windshield.

The cap 9 may be attached to the arm section 4 before or after the spring assembly is connected to the wiper arm. The cap, as clearly shown in Figures 4, 12, 15, 16 and 17, among other things, includes a pair of spaced resilient side walls and a forwardly extending curved wall provided with a generally rectangular opening 21 for receiving the inner extremity of the arm section 4. This curved wall is formed with a pair of corresponding inturned opposed projections 22 which project through generally fan shaped holes 23 provided in the side portions 12 of the arm section 4 as shown in Figures 9 and 12. The lower edge portion of each projection is provided with a notch 24 as depicted in Figure 16. A key means 25 is provided with upturned notched ends 26 which interlock with the notched projections 22 to positively lock the cap to the arm section 4. This key means is also provided with a depending finger 27 for engaging the cover 8, the purpose of which will be described subsequently.

The cap 9 is easily connected to the arm section 4 by merely spreading the resilient side walls of the cap and then sliding the cap onto the section 4 to a point to allow the projections 22 to snap into the fan shaped holes 23, after which the key means 25 is interconnected with the projections 22. The arm is held bottom side up when the key means and cover 8 are being assembled with the arm. It will be noted by reference to Figures 4 and 12 that the relationship of the projections 22 and the holes 23 is such that the cap can be tilted or pivoted to permit access to the head section 1 and the locking means 2 carried thereby. Upward movement of the cap is limited as shown and when lowered to enclose the head section 1 its outer front wall will engage the locking means as illustrated in Figures 10 and 11, the locking means serving as a stop for the cap.

The elongated cover 8 and its relationship with the arm section 4, spring assembly 7 and key means 25 will now be described. Referring to Figures 2 through 7 of the drawing the longitudinal marginal edges of the side walls 11 of the section 4 are preferably provided with three pairs of notches 28 within which ears 29 on the cover are secured by distorting portions 30 of the section thereupon. The cover is preferably provided with longitudinal side walls which fit within the confines of the section 4. The inner extremity of the cover is preferably provided with an elongated tapered embossment 31 for imparting rigidity to the cover as well as promote its appearance. This extremity is also provided with a pair of opposed parallel offsets 32 having inturned flanges 33 which hook on and bear against the sides of the legs 17 of the lever as exemplified in Figures 9, 10, 11 and 17 to resiliently locate the said inner extremity of the cover for movement in the section 4 and maintain the free extremity of the spring assembly more or less in the position shown by the full lines in Figure 10 apart from the front wall of the outer section 4. The cover is of a length to substantially conceal the spring assembly and the key means and bear against the finger 27 on the key means to normally maintain the cap 9 in a predetermined position to enclose the head 1 and locking means 2 as shown in Figures 2 and 10. More particularly in this regard the projections 22 on the cap serve as pivots and the key means as a lever which when pressed upwardly and pivoted by the cover 8 through the agency of the spring assembly causes the cap 9 to take the position just referred to. The outer end of the cover may be angled as at 34 to close off the outer end of the channel arm section 4 as depicted in Figures 2 and 3.

To connect the cover 8 with the spring assembly and arm section 4, the spring assembly is preferably pulled outwardly to the dotted line position shown in Figure 11, whereupon the cover is slid lengthwise of the spring assembly toward the head section of the arm so that the offsets 32 on the cover will straddle the legs 17 of the lever and the flanges 33 on the offsets will engage the legs. Due to the angularity of the legs 17 the free extremity of the spring assembly and the inner extremity of the cover will be pulled toward one another to assume the balanced normal operating condition depicted in Figure 10. The outer end of the lever is preferably tapered as shown in Figure 9, and this assists in piloting the cover onto the lever as illustrated in Figure 11. When the cover has been properly located with the ears 29 on the cover seated in the notches 28 in the section 4, the portions 30 of the latter are then distorted to anchor the cover in place.

Any suitable means may be utilized for connecting the head section 1 of the wiper arm to an operating means such as the drive shaft 3 but the preferred means for this purpose is clearly illustrated in Figures 9, 15, 18, 19 and 20 of the drawing and will now be described. The upper side of the radial extension 10 on the head is provided with a generally rectangular recess 35 within which is snugly received a generally C-shaped spring 36 having a flat portion which is adapted to cooperate with a cylindrical pin 37 which extends transversely through the extension 10. The pin is arranged so that a portion thereof is located in the recess. The pin is provided with a flat portion 38 which is adapted to cooperate with the flat portion of the spring for normally maintaining the pin in a predetermined rotative position. The lower end of the pin is provided with a latch 39 and its upper end with a lever 40. The lever and latch are keyed to the pin for movement therewith and are preferably arranged in the same relative rotative position on the pin so that when the lever is swung to a position over the end of the shaft as shown in Figures 9 and 10 the latch 39 will take a position under the fitting carried by the shaft 3 so as to detachably lock the head section of the arm to the fitting. The operative relationship between the spring 36, the pin, the lever, and the cap 9 is preferably such that when the cap is released or pushed from an elevated or tilted position it will engage the lever and cam it, as shown in Figure 15, to move the locking means to a locking position. The arrangement is such that the lower marginal edge of the cap will direct the locking means to a locking position and when the locking means reaches the predetermined rotative position as evidenced in Figure 19, an edge of the flat portion 38 on the pin will engage the flat portion on the spring in a manner whereby the spring being compressed by the pin will cause the pin to automatically swing the locking means to a locking position in advance of the cap. In other words, the spring is pre-loaded by movement of the pin. With this novel arrangement the cap serves as a semaphore or a signal because when the cap is in its lowermost position enclosing the head section 1 it indicates that the locking means is in a positive locking position. The cap will also cam the locking means to locking position when the lever is located on the side of the shaft opposite to which it is shown in Figure 15.

In the modification of the invention illustrated in Figures 13 and 14, the spring assembly is not operatively connected to a cap 45 or to a cover such as 8. The spring assembly of this modification is, however, connected to a head section 46 and an outer arm section 47 in the same manner as described above. The cap 45 is of such a size that when swung to a position to substantially enclose the head section the resilient side walls of the cap will frictionally engage the sides of the head section to detachably hold the cap in such position.

A modified form of means for locking a head section of an arm to a shaft is illustrated in Figure 22, and is similar to the locking means above described in that it includes a pin, latch 48 and a lever 49. The lever is preferably made resilient and the head section is provided with an interruption or abutment means preferably in the form of a notch 50 which receives the free end of the lever. With this arrangement the lever can be manually moved to the position shown in Figure 22 so that the latch will lock the head section to the shaft.

Another modified form of means for locking a head section to a shaft is exemplified in Figure 23 of the drawing. This modification is similar to the one illustrated in Figure 22, except the end of a shortened resilient lever 51 is adapted to cooperate with a depression 52 provided in the end of a shaft for maintaining a latch 53 in a locking position.

Having thus described my invention, it is obvious that various additional modifications may be made in the same without departing from the spirit of the invention; and, therefore, I do not wish to be understood as limiting myself to the exact forms, constructions, arrangements, and combinations of parts herein shown and described.

I claim:

1. A windshield wiper arm assembly comprising a shaft attaching section, an arm section pivotally connected to the attaching section, means on the arm section for supporting a wiper blade, an elongated member having its inner end pivotally connected to the arm section, and elongated resilient means having one end connected to the attaching section and its other end to the outer end of the member, the points of connection between the resilient means, attaching section and member being located at one side of the point of connection between the attaching section and arm section so that the resilient means will cause the arm section to be urged toward a windshield when the attaching section is coupled to a drive shaft.

2. A windshield wiper arm comprising a first section for attachment to a driven member and an elongated second section pivoted to the first section and extending therefrom, an elongated lever having its inner end pivoted to the inner extremity of the second section and its outer end extending toward the outer extremity of the second section, and a spring connected to the first section and to the outer end of the lever for urging the second section toward a windshield.

3. A windshield wiper arm comprising an inner section for attachment to a drive shaft and an elongated channel section pivoted to the inner section and having means at its outer end for connection with a wiper blade, an elongated lever having an inner end pivoted to the channel section and an outer free end extending forwardly toward the connection means, and an elongated spring having one end connected to the inner section and its other end to the outer free end of the lever for pressing the free end into bearing relationship with an inner surface of the channel section to urge the channel section toward a windshield.

4. A windshield wiper arm comprising a first section for attachment to a drive shaft and an elongated second section pivoted to the first section, an elongated generally V-shaped lever having flexible legs pivoted to the second section and an outer end located between the outer extremity of the second section and the points of connection between the legs and second section, and an elongated tension spring having one end connected to the first section and its other end to the said outer end of the lever for urging the second section toward a windshield.

5. A windshield wiper arm comprising an inner section for attachment to a drive shaft and an elongated channel section pivoted to the first section, a cap movably supported on the arm and extending over the inner section, and a spring urged cover connected to the channel section for substantially closing the open side of the channel section and acting on the cap to hold the cap over the inner section.

6. A windshield wiper arm comprising a first section for attachment to a drive shaft and an elongated second section pivoted to the first section and having means at its outer end for connection with a wiper blade, a cap pivoted to the arm for substantially covering the first section, a device comprising a lever and a spring respectively connected to the sections and one another for urging the second section toward a windshield, and means operatively connecting the device and cap in a manner whereby the device also serves to normally urge the cap in a predetermined direction.

7. A windshield wiper arm comprising a first section for attachment to a drive shaft and an elongated second section pivoted to the first section, a cap pivoted to the second section for substantially covering the first section, a device comprising a lever and a spring respectively connected to the sections and one another for urging the second section toward a windshield, means locking the cap to the second section, and means operatively connecting the device and locking means in a manner whereby the device also serves to normally urge the cap toward the first section.

8. A windshield wiper arm comprising an inner section, movable locking means carried by the inner section for attaching the arm to a drive shaft, an elongated wiper blade carrying section pivoted to the inner section, a cap movably supported on the arm for movement to substantially cover the first section and the locking means, said locking means having a part adapted for disposition in a predetermined location when the locking means is in an inoperative position, and said cap having a part adapted to engage the part on the locking means to direct the locking means toward a locking position when the cap is moved toward the inner section.

9. A windshield wiper arm comprising a first section, movable locking means carried by the first section for attaching the arm to a drive shaft, a second section pivoted to the first section and having means at its outer end for connection with a wiper blade, a cap supported for movement on the second section for substantially covering the first section, an elongated member carried by the second section and having a movable portion, a key operatively engaging the cap and the movable portion of the elongated member, and a device comprising a lever and a spring respectively connected to the sections and one another and cooperatively acting on the elongated member for simultaneously urging the second section toward a windshield and the movable portion of the elongated member toward the second section to cause the key to move the cap toward the first section for actuating the locking means toward a locking position.

10. A windshield wiper arm comprising a first section for attachment to a drive shaft, an elongated section pivoted to the first section and extending therefrom, a cap supported for movement on the second section for substantially covering the first section, an elongated lever having its inner end connected to the second section, an elongated spring having one end connected to the first section and its other end to the outer end of the lever for urging the second section toward a windshield, and means operatively connecting the lever to the cap so that the spring will influence movement of the cap.

11. A windshield wiper arm comprising an inner section for attachment to a shaft, an elongated outer section having its inner end pivotally connected to the inner section and a connector at its outer end for connection with a wiper blade, said outer section being of tapered channel formation throughout substantially its entire length, said channel formation having notches in the edges of its side walls, and an elongated cover having lateral projections secured in the notches of the side walls of said channel formation.

12. A windshield wiper arm comprising an inner section for attachment to a drive shaft, an elongated outer section having its inner end pivoted to the inner section, a cap supported on the outer section for movement over the inner section, an elongated member having an outer extremity secured to the outer section and an inner extremity arranged for movement, and means operatively connecting the inner extremity of the elongated member with the cap for maintaining the cap over the inner section.

13. The structure defined in claim 2, including a cover carried by one of the sections for covering at least a portion of the other section, and means operatively connecting said spring and cover for influencing the movement of the cover.

14. The structure defined in claim 2, including a cover carried by the second section and operatively connected to the spring for urging the cover in a direction to cover at least a portion of one of the sections including the pivotal connection between the sections.

15. The structure defined in claim 2, including a cover carried by the second section, an elongated member carried by the second section and operatively connected to the lever, and means operatively connecting the member and cover so that the spring will hold the member in covering relationship to the lever and spring and the cover over at least a portion of one of the sections.

16. A windshield wiper arm comprising an inner section and a section pivotally connected to the inner section for supporting a blade, a cap mounted for movement on the arm to a position for covering at least a portion thereof, and spring urged means on one of the sections operatively connected to the cap for influencing movement of the latter to said position.

17. A windshield wiper arm comprising an inner section and a section pivotally connected to the inner section for supporting a blade, biasing means operatively connecting the sections for urging the pivotal section toward a windshield when the inner section is attached to a shaft, a cap movably mounted on the arm for covering a portion of the arm, and said biasing means and cap being operatively connected so that the biasing means will influence movement of the cap.

18. A windshield wiper arm comprising an inner section and a section pivotally connected to the inner section for supporting a blade, biasing means operatively connecting the sections for urging the pivotal section toward a windshield when the inner section is attached to a shaft, a cap movably mounted on the pivotal section for covering the inner section, and means for securing the cap to the pivotal section cooperating with the biasing means for influencing movement of the cap.

19. A windshield wiper arm comprising an inner section and a channel section pivotally connected to the inner section for supporting a blade, a cap mounted for movement on the channel section to a position for covering at least a portion of the arm, and spring urged means disposed on the channel section and operatively connected to the cap for influencing movement of the latter to said position.

20. A windshield wiper arm comprising an inner section and a section pivotally connected to the inner section for supporting a blade, a cap mounted for relative movement on the arm to a position for covering at least a portion thereof and to a position in which said portion is uncovered, means carried by and offset from the cap, and spring means on one of the arm sections operatively connected to the offset means on the cap for normally urging the cap to its covering position.

21. A windshield wiper arm comprising an inner section and an outer section attached to the inner section for supporting a blade, a cap having offset means connected to the arm whereby to permit movement of the cap to a position for covering at least a portion of the arm and to a position in which said portion is uncovered, and spring means on one of the arm sections operatively connected to said offset means on the cap for normally urging the latter to its covering position.

22. A windshield wiper arm comprising an inner section for attachment to a drive shaft and a channel section pivotally connected to the inner section for supporting a blade, a cap having offset means extending through walls of the channel for mounting the cap for movement to a position for covering at least a portion of the arm and to a position in which said portion is uncovered, and spring means operatively connected to said offset means for normally urging the cap to said covering position.

References Cited in the file of this patent

UNITED STATES PATENTS

| | | |
|---|---|---|
| 1,916,544 | Whitted | July 4, 1933 |
| 1,952,866 | Hueber | Mar. 27, 1934 |
| 2,128,068 | Anderson | Aug. 23, 1938 |
| 2,286,035 | Horton | June 9, 1942 |
| 2,443,976 | Baldwin | June 22, 1948 |
| 2,528,258 | Zaiger | Oct. 31, 1950 |
| 2,576,077 | Ozarowski | Nov. 20, 1951 |